UNITED STATES PATENT OFFICE.

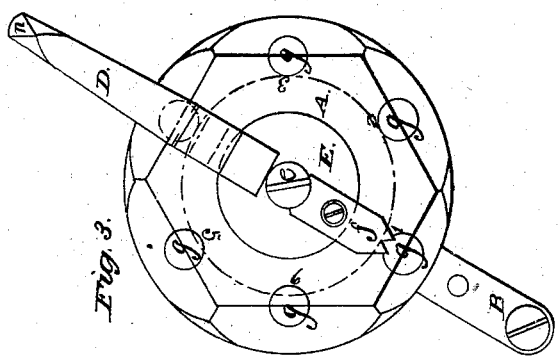
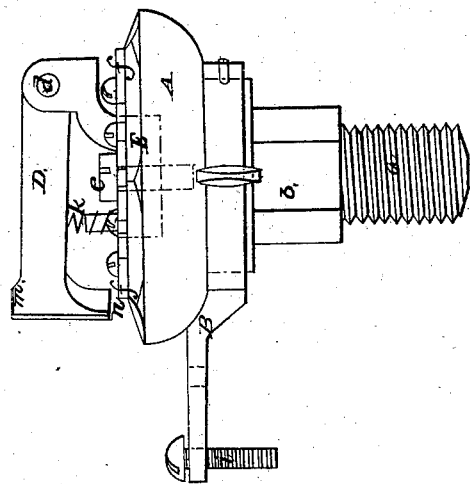
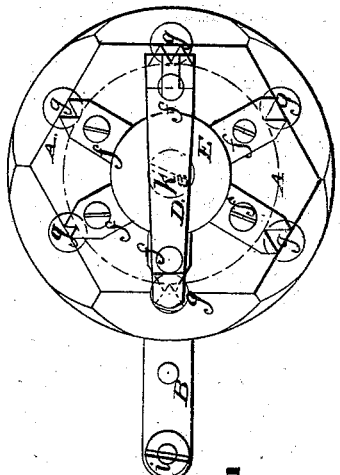
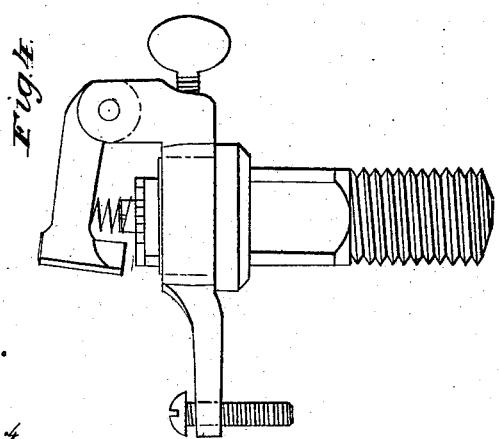
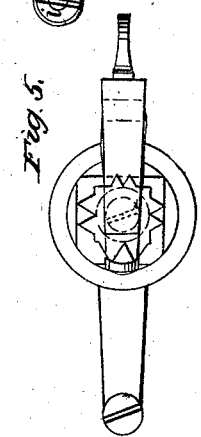

AMOS CALL, OF SPRINGFIELD, MASSACHUSETTS.

SAW-SET.

Specification of Letters Patent No. 32,179, dated April 30, 1861.

*To all whom it may concern:*

Be it known that I, AMOS CALL, of Springfield, in the county of Hampden and Commonwealth of Massachusetts, have invented a new and useful Improvement in Saw-Sets; and I do hereby declare that the following is a full, clear, and exact description of the same, reference being had to the accompanying drawings, making a part of this specification.

The use of this instrument is to bend the teeth of a saw a little outward, to cause them to cut a kerf wider than the thickness of the saw plate, so that the saw will run freely without binding.

In the drawings I have represented three different ways of constructing the set, being but slight modifications of the same principle.

Figure 1 is a side view of one style, and Fig. 2 a plan of the same. Fig. 3 is a top view of a second style and Figs. 4 and 5 side and top views of a third.

I will first describe Figs. 1 and 2. A is the body of the "set," having on the bottom a screw $a$, and nut $b$, for inserting firmly into a block or bench. B, is a rest or gage, for the blade of the saw, attached to A and capable of being rotated about it, and held in place by the thumb screw C. D is a hammer hinged at $d$, to a circular center plate E, which is let into the top of the body A of the set, and held in place by the screw $e$. On the top of A, are six gages, $f, f, f, f, f, f$, for the teeth of the saw, each gage being for a different sized tooth. $g, g, g, g, g, g$, are small steel bed pieces inserted into A, under the points of each gage, to receive the blow of the hammer. In the end of each gage $f$, is a notch corresponding to the form of a saw tooth but varying in size to fit a fine or coarse saw. The points or bottoms of the notches are all equally distant from the center $h$ of the center plate E, so that the point of the hammer which is of a corresponding form will fit into all the notches as it is rotated in its center $h$. The top of A, is beveled outward from the end of each gage, to allow the back of the saw to be lowered sufficiently to get the desired set in the teeth, the screw $i$ in the rest B serving as a gage to regulate the amount of set. $k$ is a small spiral spring to throw the hammer up after each blow. Now the operation is as follows: Having a saw to be set, select the gage having a notch corresponding nearly to the size of the tooth of the saw. Then rotate the hammer until its point fits into the notch of the gage selected, and confine it in place by tightening the center screw $e$. Now loosen the thumb screw C, and bring the gage rest B to correspond with the hammer as shown in the drawing. Now rest the blade of the saw on the head of the screw $i$, and placing a tooth in the notch of the gage, strike the top $m$, of the hammer a suitable blow. The face $n$, comes down on to the point of the tooth with sufficient force to bend it down to the face of the bed piece $g$, thus giving it the desired set. Thus by means of the rotary hammer D and a properly constructed body piece A, one instrument is made to fit all grades of saws within reasonable limits. As the top of A is beveled off on its several sides just to the points of the gages, the face of the hammer all projects over the line of bevel, except just the size of the notch and therefore only strikes on the side of the tooth.

Fig. 3 represents a different arrangement in which one gage serves for all the different sizes of teeth. A, is the body of the set, $g, g, g$ bed pieces, D, the hammer thrown back showing the form of the face $n$. E is a center plate as in the one just described. $f$ is a gage with a notch of a suitable size to fit the smallest tooth required, and attached to the center plate instead of to the body A. The notch in the gage only serves as a guide for the point of the tooth, the position of the beveled portion of A determining the size of the tooth, as for a small tooth the bevel extends on to the top face of A farther than for a large one, as will be seen from the dotted circle struck from the center of E and passing through the point of the notch in the gage. As represented in Fig. 3 the instrument is set for a large tooth. Now if it is required to set a fine saw, I loosen the center screw and rotate the center plate with hammer and gage attached till the point of the gage comes to bed piece No. 6, and then confine them by tightening the center screw. Bring the rest gage B, to a corresponding position and proceed as described in Figs. 1 and 2.

Figs. 4 and 5 represent another style designed for a cheaper instrument, having the hammer attached to the rest gage and rotating with it instead of on a center plate. The gages are made for only four sizes of teeth instead of six as in the two forms just described, and are all in one piece secured permanently to the top of the body piece.

All these different designs embody the one idea of a rotary hammer operating in combination with other suitable devices which may be varied at pleasure.

Now having fully described the construction and operation of my invention what I claim as new and desire to secure by Letters Patent is—

A rotary hammer applied to saw sets substantially in the manner and for the purpose herein described.

AMOS CALL.

Witnesses:
R. KINSLEY,
MILTON BRADLEY.